Feb. 18, 1936.  R. HOFSTETTER  2,030,988
COIL WINDING MACHINE
Filed Dec. 10, 1931  8 Sheets-Sheet 1
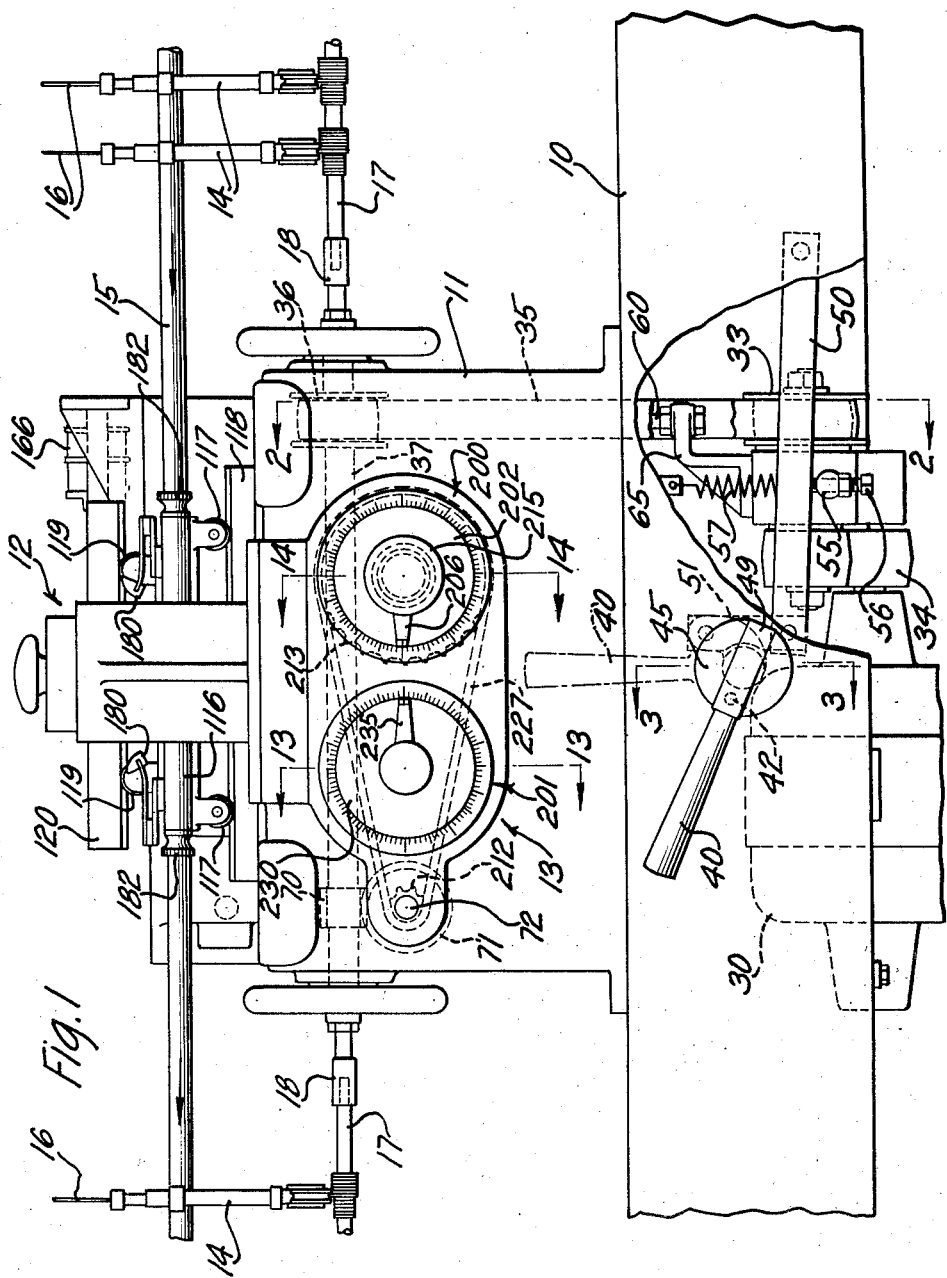
Inventor
R. Hofstetter
By H. Q. Whitehorn Att'y.

Feb. 18, 1936.   R. HOFSTETTER   2,030,988
COIL WINDING MACHINE
Filed Dec. 10, 1931   8 Sheets-Sheet 2
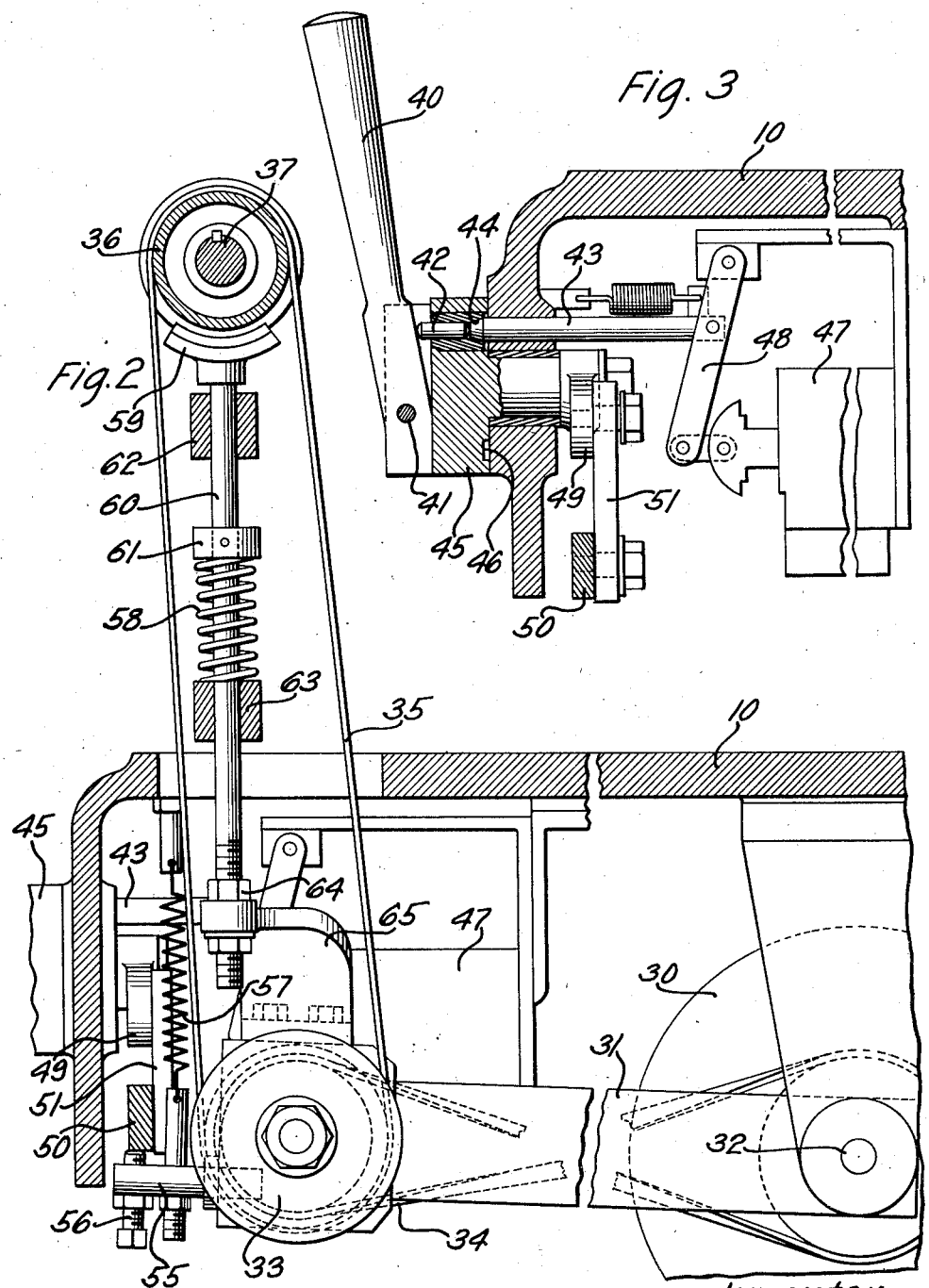
Inventor
R. Hofstetter
By H. A. Whitehorn Atty.

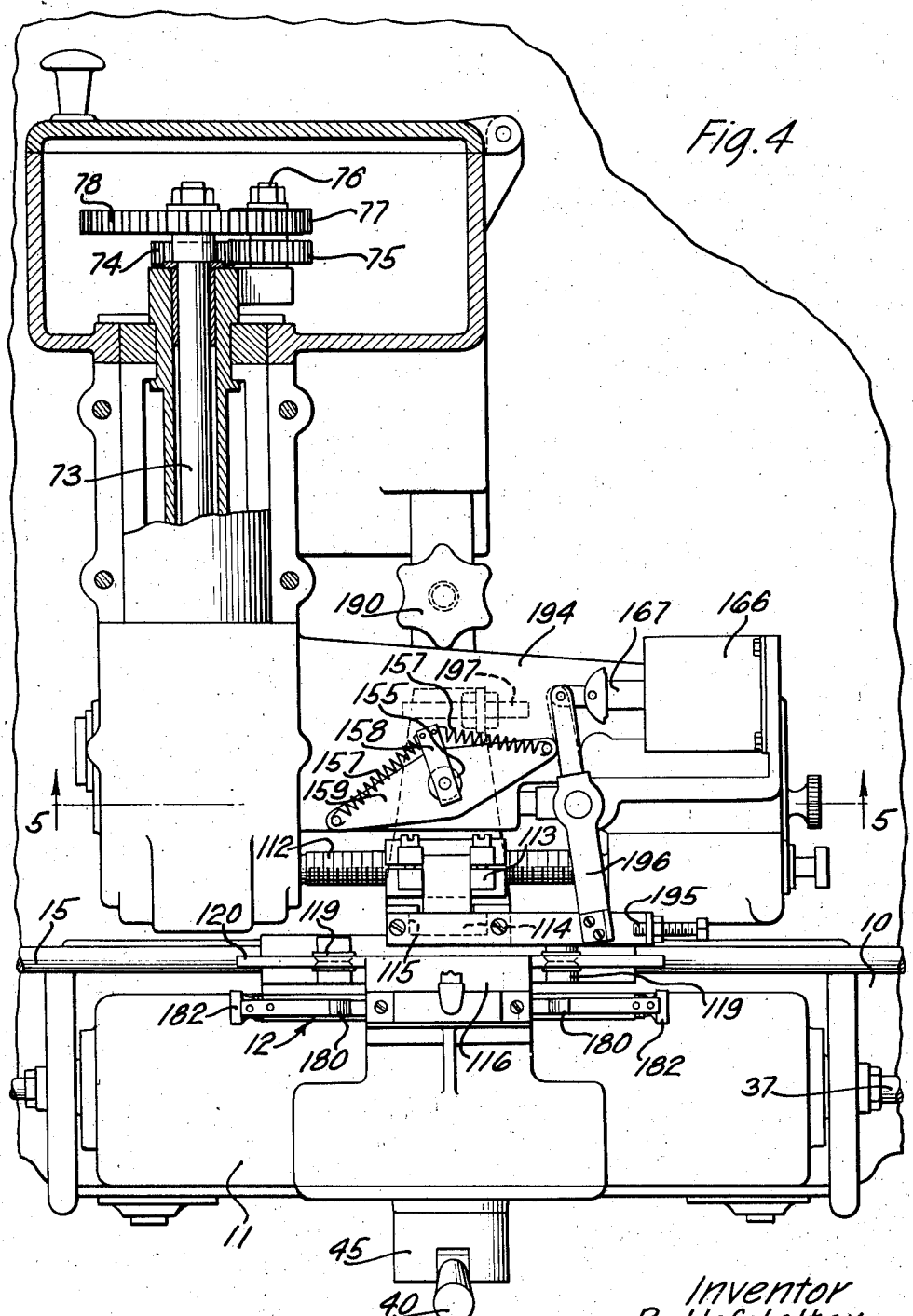

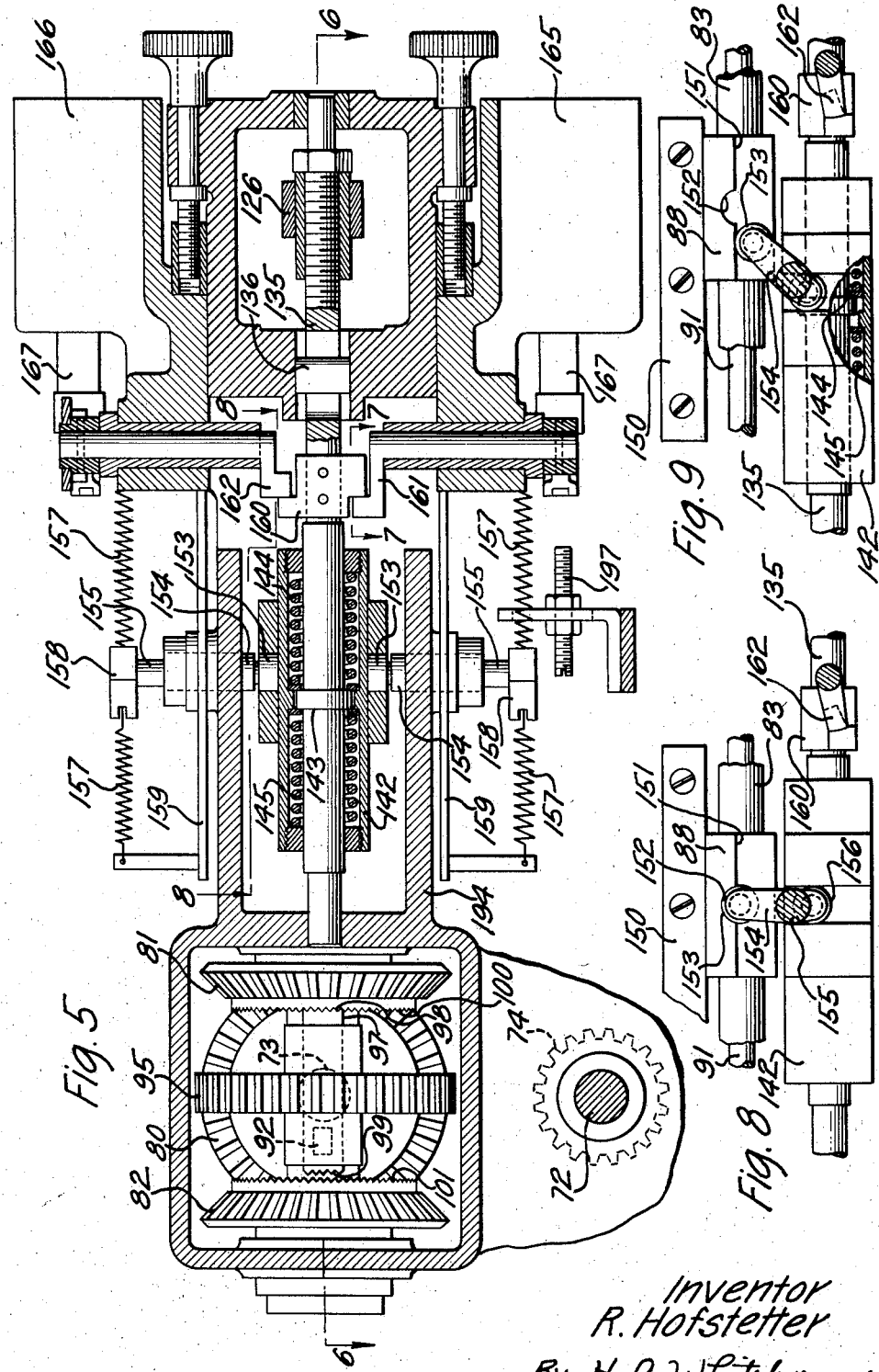

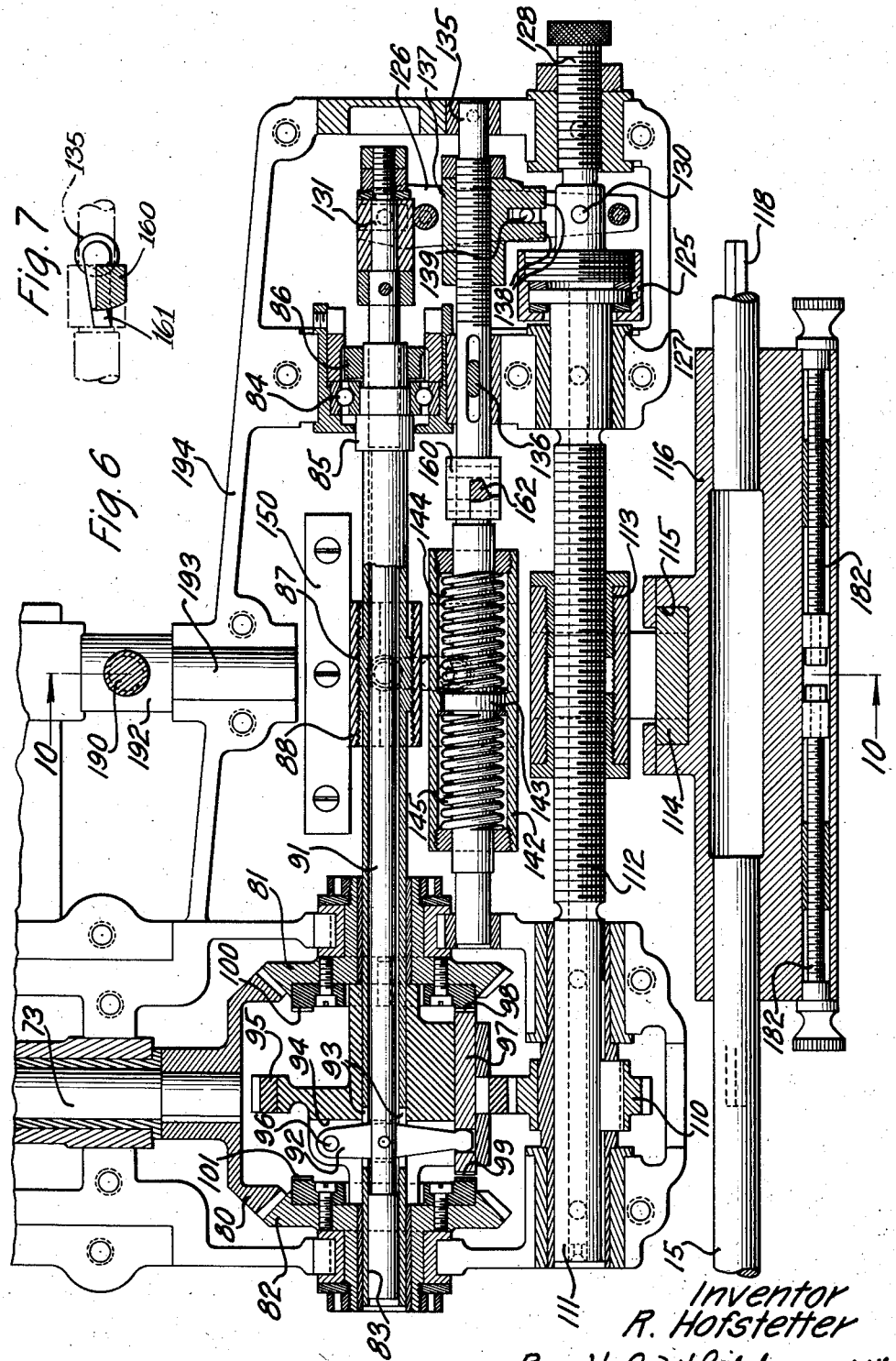

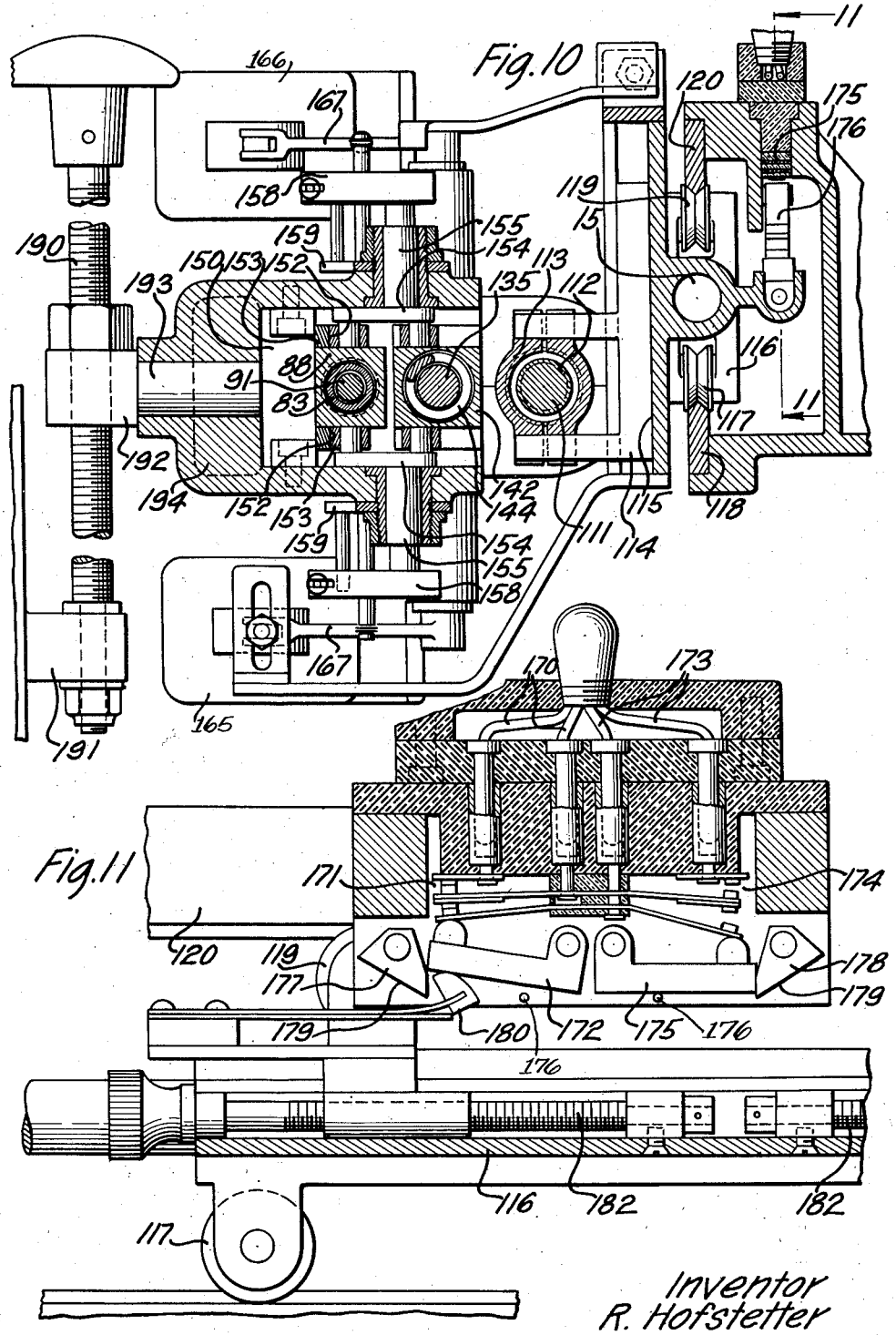

Inventor
R. Hofstetter
By H. A. Whitehorn Atty.

Feb. 18, 1936.   R. HOFSTETTER   2,030,988
COIL WINDING MACHINE
Filed Dec. 10, 1931   8 Sheets-Sheet 8
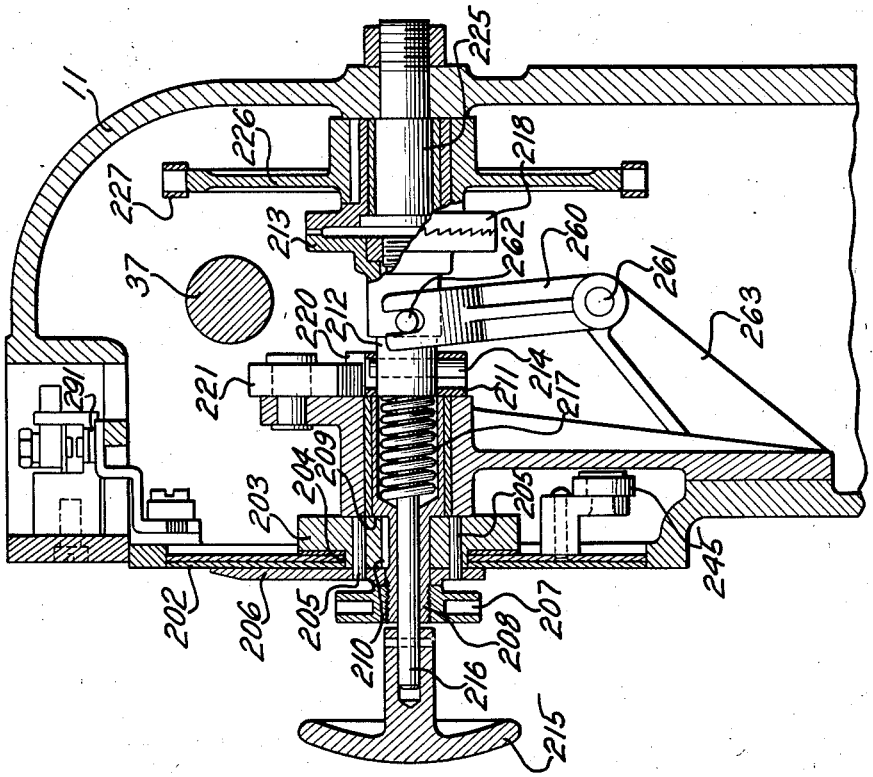
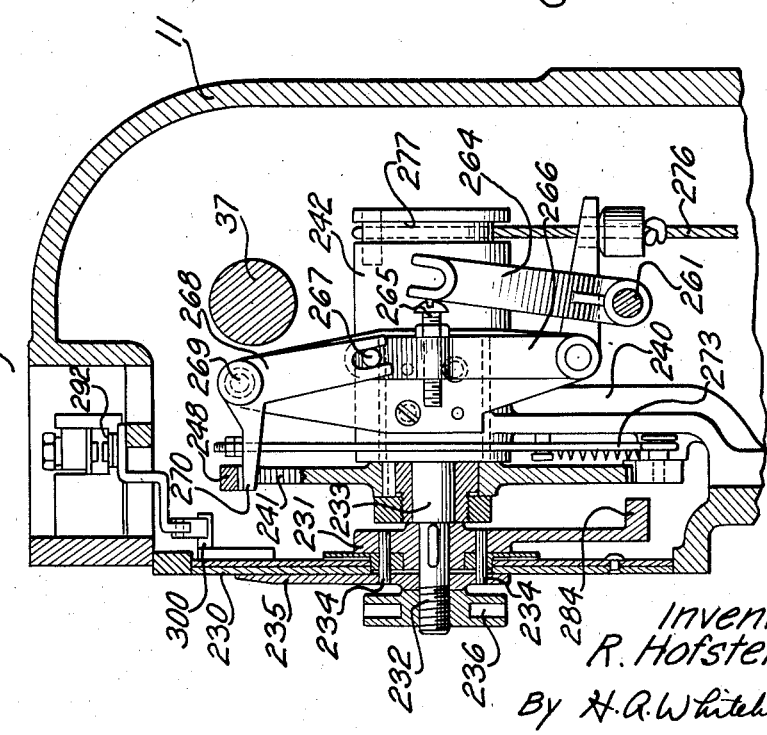
Inventor
R. Hofstetter
By H.Q. Whitehorn Atty.

Patented Feb. 18, 1936

2,030,988

UNITED STATES PATENT OFFICE 2,030,988

COIL WINDING MACHINE

Robert Hofstetter, Downers Grove, Ill., assignor to Western Electric Company, Incorporated, New York, N. Y., a corporation of New York Application December 10, 1931, Serial No. 580,183

19 Claims. (Cl. 242—9)

This invention relates to a coil winding machine and more particularly to a machine for winding electrical coils.

The object of this invention is to provide a more practical, efficient and expeditious machine for winding coils.

In accordance with the object of the invention, there is provided in one embodiment thereof, a coil winding machine for distributing series of convolutions of strand upon winding spindles in forming coils and counting the number of convolutions for each coil.

One embodiment of this invention comprises a threaded shaft having a limited reciprocation, means for rotating the shaft to cause a strand distributing element associated therewith to move first in one direction and then in the reverse direction, depending upon the direction of rotation of the shaft, means for determining the direction of rotation of the shaft, and means operated in accordance with the direction of rotation of the shaft for conditioning means for operation which is rendered effective when the distributing element has traveled a predetermined distance for moving the threaded shaft in the direction of its length and causing a quick reversal of the direction of movement of the distributing element. The threaded shaft is tiltable or angularly adjustable relative to the axis of the winding spindle to alter the speed of the movement imparted to the distributing element by the threaded shaft.

Other objects and advantages of this invention will be more fully understood from the following detailed description taken in connection with the accompanying drawings, wherein Fig. 1 is a fragmentary front elevational view of the machine;

Fig. 2 is an enlarged sectional view taken along the line 2—2 of Fig. 1;

Fig. 3 is an enlarged sectional view taken along the line 3—3 of Fig. 1;

Fig. 4 is a fragmentary top plan view of the machine, a portion thereof being shown in section;

Fig. 5 is an enlarged sectional view taken substantially along the line 5—5 of Fig. 4;

Fig. 6 is a sectional view taken along the line 6—6 of Fig. 5;

Fig. 7 is a fragmentary sectional view taken along the line 7—7 of Fig. 5;

Fig. 8 is a fragmentary sectional view, taken along the line 8—8 of Fig. 5, of the spring tensioning mechanism shown in neutral position;

Fig. 9 is a view of the spring tensioning means when moved in a position to compress one of the springs;

Fig. 10 is a sectional view taken along the line 10—10 of Fig. 6;

Fig. 11 is an enlarged sectional view taken along the line 11—11 of Fig. 10;

Fig. 13 is an enlarged sectional view taken along the line 13—13 of Fig. 1; and

Fig. 14 is an enlarged sectional view taken along the line 14—14 of Fig. 1.

Figure 12:
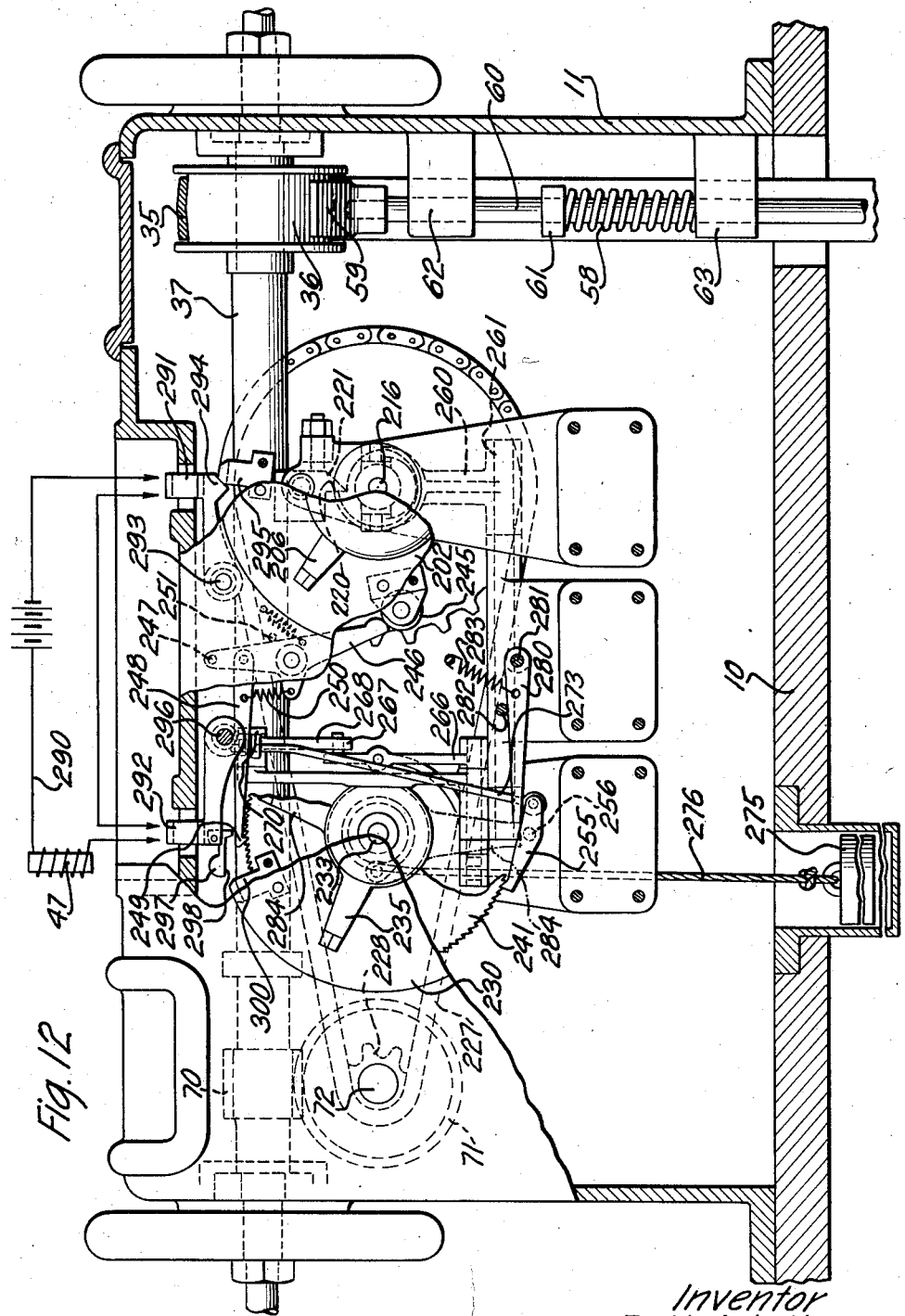
Fig. 12 is a fragmentary front elevational view of the machine illustrating a portion of the counter mechanism.

Referring now to the drawings wherein like reference numerals designate similar parts throughout the various views, it will be noted that a supporting base 10 has mounted thereupon a housing 11 which supports and partly houses a distributing mechanism, indicated generally at 12 and a counting mechanism indicated generally at 13. These two features are the subject matter of this application, the paper feeding mechanism, which feeds a portion of paper over each series of strand windings, being disclosed in a copending application of Robert Hofstetter and John W. Sager, Serial No. 508,184, filed December 10, 1931, and the distributing or strand guiding members, indicated at 14, being disclosed in a copending application of John A. Whittaker, Serial No. 494,228, filed November 8, 1930 now Pat. 1,929,940 issued Oct. 10, 1933.

The distributing mechanism will be described first and, as shown in Fig. 1, this mechanism consists of a distributing bar 15 upon which any desired number of the distributing members 14 may be mounted at spaced positions for the purpose of distributing strands 16 of material upon winding spindles 17 when rotated. The winding spindles 17 have their ends removably secured in chucks 18 and are provided with longitudinally extending grooves and keys for securing the ends of the strands thereto before the winding operation is started.

The mechanism for imparting a rotary movement to the winding spindle 17 is shown in Fig. 2 and consists of a motor 30 mounted upon a bracket 31 hingedly carried by the supporting base 10, the hinge connection of the bracket being in alignment with the axis of the motor. The outer end of the bracket 31 has a double pulley 33 rotatably mounted thereupon, one portion of which receives a belt 34 connecting it with the motor 30, and the other portion of which receives a belt 35 connecting it with a pulley 36. The pulley 36 is fixed to a shaft 37 which extends through the housing 11 and drives the innermost chucks 18.

When the belt 35 is held taut and the motor 30 is energized, a rotary movement will be imparted to the winding spindles 17 for winding the strands thereupon. The means for holding the belt 35 taut, for causing a driving connection between the motor 30 and the winding spindles 17, and for loosening the belt 35 upon the pulley 36 and at the same time applying a brake 59 to the pulley 36 to stop the rotation of the winding spindles 17, consists of a hand-lever 40 (Fig. 3) pivoted at 41 and arranged to move a pin 42 inwardly to remove a retaining bar 43 free of an aperture 44, against the tension of a spring, for allowing movement of the lever 40 with a pivoted head 45 to which it is secured. The pivoted head 45, which has the pin 42 and the aperture 44 disposed therein, has an annular recess 46 associated with the aperture 44 in which the end of the retaining bar 43 rides during the rotary movement of the pivot head 45 for the purpose of frictionally holding the pivot head in any position into which it is moved. The inward movement of the retaining bar 43 is also controlled automatically by a suitable electrical control mechanism 47, through a link 48, when a predetermined number of windings have been made for moving the retaining bar free of the pivot head 45 for allowing the pivot head to resume its normal position.

The rotation of the pivoted head 45 in a clockwise direction, looking from the left (Fig. 3), will impart movement to the lever 49 and due to the connection of a bar 50 with the lever 49 by means of a link 51, a downward movement will be imparted to the bar. The connection of the bar 50 with the bracket 31 is shown in Figs. 1 and 2 and consists of a projection 55 connected to the bracket 31 and having an adjusting screw 56 disposed in the outer end thereof and arranged to engage the bar 50; therefore, a movement of a hand-lever 40 with the pivoted head 45 in a clockwise direction will cause the bar 50 to move downwardly, thus forcing with it the free end of the bracket 31 and by doing so the belt 35 will be drawn taut over its pulleys, effecting a driving connection between the winding spindle and the motor. When the tension upon the belt 35 is released due to the movement of the hand-lever 40 in a counter-clockwise direction, a helical tension spring 57 aided by the force of a helical compression spring 58 will move the free end of the bracket 31 upwardly, making the belt 35 loose and applying a brake 59 to the pulley 36 to stop the rotation thereof. The brake 59 is carried by a brake rod 60 and extends through the spring 58, carrying thereupon a spring abutting ring 61 and extending through bearings 62 and 63, the latter of which the spring 58 rests upon. The lower end of the brake rod 60 is adjustably secured at 64 to an arm 65 which is fixed to the free end of the bracket 31.

The distributing mechanism is connected to the power means shown in Figs. 2 and 3 and is illustrated in Figs. 5 to 11, inclusive. The driving connection between the motor 30 and the shaft 37, hereinafter called the spindle shaft, is shown in Fig. 1 and in this figure there is also shown a spiral gear 70 mounted upon the spindle shaft 37 and interengaging a spiral gear 71.

The spiral gear 71 is fixed to a shaft 72 which extends rearwardly beneath a shaft 73, shown in Figs. 4 and 5 and parallel therewith, these shafts being operatively connected together by a series of reduction gears. These reduction gears consist of a relatively small gear 74 mounted upon the shaft 72 which interengages a gear 75 fixedly mounted upon a stub shaft 76, which also has fixedly mounted thereupon a gear 77 interengaging a relatively large gear 78, the last mentioned gear being fixedly mounted upon the rearmost end of the shaft 73. The shaft 73 extends forwardly and has a bevel gear 80 mounted upon the forward end thereof, as shown in Figs. 5 and 6. Interengaging the bevel gear 80 are bevel gears 81 and 82 which are journaled in bearings in the housing 11 and are freely rotatable upon a hollow shaft 83.

The hollow shaft 83 is journaled in a roller bearing 84 for the purpose of allowing the shaft to rotate freely and is provided at one end with a collar 85, to hold the shaft against longitudinal movement in one direction, another collar 86 holding the shaft against longitudinal movement in the opposite direction. A portion of the hollow shaft 83 near the center thereof has external threads 87 receivable in an internally threaded spring compressing collar 88, the purpose of which will hereinafter be described. Freely movable in the hollow shaft 83 is a clutch actuating rod 91 pivotally secured at one end to a clutch actuating arm 92, which extends through aligned slots 93 in the hollow shaft 83, and into a recessed portion 94 of a gear 95, where one end is pivotally mounted at 96, and the other end receivable in an aperture of a sliding clutch 97. Clutch 97 is of a plate-like formation slidably disposed in an aperture of the gear 95 and having teeth 98 and 99 at the ends thereof which are arranged to interengage teeth of annular clutch members 100 and 101, which are fixed to the bevel gears 81 and 82, respectively. The purpose of the clutch 97 is to change the direction of rotation of the gear 95.

In Fig. 6 the clutch 97 is shown engaging the clutch member 100, thus connecting the gear 95 with the bevel gear 81 and, due to the continuous rotation of the bevel gear 81 when the machine is in operation, the gear 95 will be rotated therewith in one direction; whereas, if the clutch member 97 was moved to the left to operatively connect the gear 95 with the bevel gear 82, the gear 95 would be rotated in the opposite direction.

The distributing bar moving mechanism shown in Fig. 6 is operatively connected to the gear 95 and the direction of movement of the distributing bar 15, which is carried by this mechanism, is determined by the direction of rotation of the gear 95. This mechanism consists of a pinion 110 interengaging the gear 95 and keyed to a threaded shaft 111 in such a manner that the shaft may be moved longitudinally relative to the pinion yet rotated thereby. The ends of the shaft 111 are journaled in suitable bearings while the central portion thereof is threaded as at 112 and has disposed concentric therewith an internally threaded collar or nut 113. The collar 113 has a flanged member 114 slidably receivable in a recessed portion 115 of a distributing bar supporting member 116 so as to permit movement of the mechanism, shown above the member 116, relative thereto for the purpose hereinafter described.

The distributing bar 15, with the distributing units 14 mounted thereupon, extends through and is carried by the supporting member 116. The supporting member 116 is illustrated in Figs. 10 and 11 as being provided with a lower set of grooved rollers 117 which ride upon a stationary track 118 and an upper set of grooved rollers 119 which ride along a stationary track 120, thus assuring the proper positions of the distributing units 14 relative to the winding spindles 17 during the lateral movement thereof.

Referring again to Fig. 6, it will be noted that the end of the shaft 111 at the right of the pinion 110 is rotatably receivable in a non-rotatable coupling or collar 125, the purpose of which is to form a connection between the shaft 111 and an actuating lever 126 and to abut a stationary member, such as a bushing 127, to limit the longitudinal movement of the shaft 111 in one direction. The longitudinal movement of the shaft 111 in the opposite direction is limited by an adjusting screw 128 forming an abutment for the coupling 125. The actuating lever 126 is pivotally secured to the coupling 125 at 130 and is operatively connected to the clutch actuating rod 91 at 131 so that when the lever is moved laterally, as for example, to the left (Fig. 6), movement will be imparted to the clutch actuating rod 91 to move the clutch 97 from its position in engagement with the clutch member 100 to a position in engagement with the clutch member 101, causing an immediate rotation of the gear 95 in an opposite direction, and at the same time the lateral movement of the actuating lever 126 will cause a longitudinal movement of the shaft 111, which reverses the movement of the distributing bar 15 and moves it for a short distance at a faster rate of speed than is imparted thereto through the collar 113.

The means for moving the lever 126 laterally consists of a spring controlled rod 135, keyed at 136 to permit longitudinal movement but to prevent rotative movement of the rod, and provided at 137 with a yoke which is adjustable upon the rod by means of a threaded connection and has projecting fingers 138 straddling a pin 139, both forming a connection between the spring controlled rod 135 and the lever 126. The spring controlled rod 135 extends through a spring casing 142 and has an enlarged portion or shoulder 143 thereupon which is normally positioned adjacent the center of the casing 142. Helical springs 144 and 145 are disposed in the casing 142 concentric with the rod 135 and upon each side of the shoulder 143.

The casing 142 is movable relative to the spring controlled rod 135 and the mechanism for imparting movement thereto is shown in Figs. 5, 6, 8 and 9. This mechanism includes the internally threaded collar 88 which is moved, due to the threaded connection thereof with the hollow shaft 83, when the hollow shaft is rotated. The collar 88 is square in general contour, one surface of which slidably engages a guide block 150 to hold the collar against rotation and has roller engaging surfaces 151 upon opposite sides thereof which include recesses 152. When the collar 88 is in its neutral position, rollers 153 of levers 154 will be positioned in the recesses 152 and the levers 154 will be substantially at right angles to the center line of shaft 91, as shown in Fig. 8. The levers 154 are pivoted at 155 and have rollers 156 mounted upon the lower ends thereof, which form a connection between the casing 142 and the levers 154. Therefore, when the collar 88 moves in one direction, as illustrated in Fig. 9, the rollers 153 ride out of the recesses 152, causing an actuation of the levers 154, to move the casing 142 relative to the spring controlled rod 135, thus compressing one of the springs disposed in the casing. An equalizing means is shown in Figs. 4 and 5 for urging the levers 154 into their neutral positions, comprising sets of springs 157 having their inner ends secured to arms 158, which are connected to levers 154 at their pivots so that they will rotate with the levers, and their outer ends secured to laterally extending projections of stationary members 159.

Means is provided for holding the spring controlled rod 135 against longitudinal movement while energy is being stored in one of the springs 144 or 145, this means comprising a stop member 160 fixed to the rod 135 and having upwardly and downwardly extending projections arranged to be engaged by electrically controlled latches 161 and 162. The latches are rotatably disposed in suitable bearings and arranged to be moved at predetermined intervals to release the spring controlled rod 135 and allow it to be moved by the energy stored in one of the springs 144 and 145 to bring about an instantaneous shifting of the clutch 97 and longitudinal movement of the shaft 111.

The solenoids for actuating the latches 161 and 162 are indicated generally at 165 and 166, the cores 167 of which extend outwardly and are operatively connected to the latches, as shown in Fig. 10. A switch actuating means, shown in Fig. 11, is associated with the solenoids 165 and 166 in a desired circuit arrangement so that the solenoids may be energized at predetermined intervals for releasing one of the latches for bringing about a movement of the clutch actuating rod 91 and the shaft 111 in one direction, due to the energy stored in one of the springs 104 or 105 when a predetermined number of convolutions of strands have been wound upon the winding spindle, and releasing the other latch at a predetermined interval to effect movement of the rod 91 and the shaft 111 in the opposite direction.

The switch mechanism shown in Figs. 10 and 11 includes a pair of conductors 170 of a circuit, including the solenoid 165 and a switch 171, which is closed when a switch actuating lever 172 is moved upwardly about its pivot. A pair of conductors 173 are included in a circuit in which the solenoid 166 is disposed, together with a switch 174 which is closed when a switch actuating lever 175 is moved upwardly about its pivot. The switch actuating levers 172 and 175 are limited in their downward movement by stop pins 176 (Fig. 11).

Pivotally supported cam blocks 177 and 178 are positioned to engage the outer ends of the switch actuating levers 172 and 175 to prevent rotation of the cam blocks in counterclockwise and clockwise directions, respectively, and are provided with tapered surfaces 179 in engagement with which resiliently supported hammers or lever actuating members 180 may ride. There is only one resiliently supported hammer shown in Fig. 11 but a similar resiliently supported hammer is adjustably carried by the supporting member 116 and positioned to the right as shown in Fig. 1. The hammers 180 have arcuate shaped engaging surfaces which ride downwardly against the tension of the springs, while in engagement with the tapered surfaces 179, until they have passed beyond the inner extremities thereof, at which time the springs will force the hammers upwardly to impart a rapid movement to the switch actuating levers 172 and 175 to bring about an instantaneous closing of the switches 171 and 174. The switch 171 is closed in this manner when the distributing bar has moved a predetermined distance to the right (Figs. 1, 6 and 11) and the switch 174 is closed when the distributing bar has moved a predetermined distance to the left. The hammers 180, in moving away from the switch actuating positions, engage the cam blocks 177 and 178, move them about their pivots until the hammers are moved free thereof and the cam blocks are then allowed to return by gravity to the positions shown in solid lines in Fig. 11. The time at which these switches are closed may be varied to vary the number of convolutions wound upon the winding spindles 17, this being accomplished by actuating the adjusting screws 182 carried by the supporting member 116 (Figs. 6 and 11), for affording lateral movement to the spring actuating hammers 180.

Means is provided whereby the speed at which the distributing bar 15 is moved may be varied to vary the number of convolutions per inch upon the winding spindles, this means comprising an adjusting screw 190 (Figs. 4, 6 and 10) which is held against vertical movement by the stationary bracket 191, positioned adjacent the lower extremity thereof, and is threadedly connected to a collar 192 pivotally secured at 193 to a housing 194 in which the mechanism shown in Fig. 6 above the supporting member 116 is disposed. When the adjusting screw 190 is rotated in a clockwise direction (Fig. 4), the housing 194 and the mechanism disposed therein is moved downwardly through an arcuate path, relative to the supporting member 116 and about the shaft 73 as a pivot, this relative movement being permitted by the flange and groove connection 114 and 115 shown in Figs. 6 and 10. This movement of the housing 194 relative to the supporting member 116 tilts the shaft 111 at an angle relative to the distributing bar 15, making it necessary for the shaft 111 to be rotated a greater number of revolutions to move the distributing bar the desired distance. Therefore, the greater the angle at which the shaft 111 is tilted relative to the distributing bar 15, the greater will be the number of convolutions of strand material wound upon the winding spindles 17 during the travel of the distributing bar 15. Furthermore, if small strands are to be wound upon the winding spindle, these strands will require a greater number of convolutions per inch than will larger strands of material. To cover a great range in the size of the strands to be wound, change gears 74, 75, 77 and 78 are replaced by gears giving the required ratio approximately.

To prepare the machine for operation, the strands 16, which are supplied from reels supported in any suitable manner, are threaded around sheaves carried by the distributing members 14 and their free ends secured at spaced positions to the winding spindles 17. In starting the machine the motor switch is closed to energize the motor 30 and the lever 40 is moved inwardly to move the rod 43 free of the aperture 44, after which the lever 40 is moved in an arcuate path to rotate the pivot head 45 in a counter-clockwise direction (Fig. 1) so as to actuate the lever 49 and move the bar 50 downwardly (Figs. 1 and 2), to move the forward end of the bracket 31 downwardly to tighten the belt 35 upon its pulleys and operatively connect the spindle shaft 37 and the winding spindles 17 with the motor 30. During the rotation of the shaft 37, the shaft 73 is rotated at a predetermined speed in the direction of the arrow (Fig. 6) causing continuous rotation of the bevel gears 81 and 82.

As illustrated in Fig. 6, the clutch 97 engages the clutch member 100, forming an operative engagement of the bevel gear 81 with the gear 95 and causing a counter-clockwise rotation of the gear 95, looking from the left thereof. During the rotation of the gear 95 in the counter-clockwise direction, the distributing bar 15 is moved to the right at a predetermined rate of speed to cause an even distribution of the convolutions of strands upon the winding spindle, due to the connection of the distributing bar 15 with the gear 95, through the shaft 111 and the pinion 110.

While the distributing bar 15 is being moved to the right, the collar 88 is moved to the right as shown in Fig. 9, causing an actuation of the levers 154 to move the casing 142 to the left and compress the spring 144. The spring 144 remains compressed until the distributing bar 15 is moved the desired distance to the right, at which time one of the hammers 180 will pass beneath the block 177 and be moved upwardly by its spring to rapidly move the actuating lever 172 upwardly and close the switch 171. The closing of the switch 171 completes the circuit through the solenoid 165, energizing the solenoid to release the latch 161 from the stop member 160 and allowing the energy stored in the spring 144 to move the spring controlled bar 135 to the left (Figs. 5 and 6).

When the latch 161 is released, a rapid movement is imparted to the spring controlled rod 135, moving it to the left (Fig. 6), and in doing so the shaft 111 is moved to the left until the coupling 125 abuts the bushing 127, bringing about a quick reversal in the movement of the distributing bar 15 and advancing the distributing bar a predetermined distance to the left to position the first convolution of each of the strands at a proper position so that when the coils are finished and cut into their proper lengths, the end convolutions of each coil will be positioned inwardly from the edges of the portions of insulating material upon which they are wound. The rapid movement of the spring controlled rod 135 to the left, due to its operative connection with the actuating rod 91, brings about a movement of the clutch actuating arm 92 about its pivot 96 to move the clutch 97 from the position shown in Fig. 6 in engagement with the clutch member 100 to a position out of engagement with the clutch member 100 and in operative engagement with the clutch member 101.

This shifting of the clutch 97 reverses the direction of rotation of the gear 95, causing the hollow shaft 83 to rotate in a clockwise direction, looking from the left (Fig. 6), and move the collar 88 to the left, during which movement the levers 154 will be moved from the position shown in Fig. 9, back through the neutral position, and moved to position the rollers 153 at the left, so as to move the casing 142 to the right, compressing the spring 145 while the spring controlled rod 135 is held against movement by the latch 162. As soon as the clutch 97 is moved to the left, an operative engagement is made between the bevel gear 82 and the gear 95, and the shaft 111 is rotated in a counterclockwise direction, looking from the left (Fig. 6), causing the nut or collar 113 to move to the left at a predetermined rate of speed. The movement of the collar 113 to the left is continued, moving with it the supporting member 116 and the distributing bar 15, causing an equal distribution of the strands upon the winding spindles 17 until the hammer 180, which is being moved toward the retaining block 178, passes beneath the surface 179 thereof and forces the switch actuating lever 176 upwardly to close a switch 175. When the switch 175 is closed, a circuit is completed through the solenoid 166, causing an actuation of the latch 162 to release it from the stop member 160 and allowing the energy which is stored in the spring 145 to move the spring controlled rod 135 to the right, bringing about a quick shifting of the clutch 97 into engagement with the clutch member 100 and a rapid movement of the shaft 111 to the right to reverse the travel of the distributing bar 15 until the strands are advanced the desired distance in beginning their travel toward the right. The connection of the spring controlled rod 135 with the shaft 111 and the actuating bar 91 is such that either the shaft 111 or the actuating bar 91 may be moved first, but the movement of the spring controlled rod is instantaneous, thus imparting almost a simultaneous movement to both of these elements.

In order to vary the number of convolutions wound upon the winding spindles 17, the adjusting screws 182 are actuated so as to move the hammers 180 toward or away from each other, the movement of the hammers toward each other decreasing the number of strands wound upon the winding spindles, and the movement of the hammers away from each other increasing the number of strands wound upon the winding spindles. To assure the reversing of the distributing bar moving mechanism in case something unforeseen occurs in the electrical means for releasing the latches 161 and 162, mechanical means is provided which includes an adjustable abutting screw 195 carried by the supporting member 116 and arranged to engage a lever 196 for releasing the latch 162 (Fig. 4) and an adjustable stop member 197 carried by the supporting member 116 and arranged to release the latch 161.

The counting mechanism is illustrated in Figs. 1, 12, 13 and 14 and consists of a units indicator and a hundreds indicator indicated generally at 200 and 201, respectively. The units indicator 200 consists of a dial 202 operatively connected to the shaft 37 and calibrated at its periphery in such a manner that each space between the calibrations will indicate the distance the dial will move during each rotation of the winding spindles 17. A collar 203 (Fig. 14) has a reduced portion 204 concentric with which the dial 202 is rotatably disposed. Pins 205 are frictionally disposed in the collar 203 and extend into apertures of a pointer 206 for the purpose of holding the pointer against rotation relative to the collar. A lock nut 207 which is mounted upon a threaded portion of a hollow shaft 208, the latter having a shoulder 209 abutting the collar 203, is arranged to be moved against the pointer 206 for forcing the pointer into close engagement with the dial 202 to move the dial 202 into close engagement with the collar 203 so that the pointer and the dial will be rotated when the collar 203 is rotated.

Means is provided for operatively connecting the collar 203 with the shaft 37, this means including the hollow shaft 208 which is keyed to the collar 203 at 210 and has an enlarged portion 211 at the inner end thereof for receiving a reduced portion 212 of a laterally movable clutch member 213. The movable clutch member 213 is operatively connected to the hollow shaft 208 by a pin 214 carried by the reduced portion 212 and permitting lateral movement of the clutch member, which movement may be imparted thereto by an operator pulling upon a handle 215 (Fig. 14). The handle 215 is connected to the movable clutch member 213 by a connecting rod 216, concentric with which is disposed a spring 217, positioned in the hollow shaft 208 for the purpose of normally urging the movable clutch member 213 into operative engagement with a fixed clutch member 218. The enlarged portion 211 of the hollow shaft 208 has an abutting projection 220 arranged to freely pass beneath a pivoted stop member 221 (Figs. 12 and 14) during the operation of the machine, the stop member 221 stopping the rotation of the shaft 208 and the rotatable members associated therewith, including the dial 202, during the resetting of the units indicator 200.

A fixed clutch member 218 is mounted upon a stub shaft 225, which is carried by a housing 11, and is keyed to a sprocket wheel 226 which is operatively connected to the shaft 72 by a chain 227 and a sprocket wheel 228, the latter being fixed to the shaft 72. This mechanism forms an operative connection between the shaft 37 and the units indicator 200 for rotating the dial 202 and the pointer 206 the distance of one space upon the dial during one complete revolution of the winding spindles 17 and for rotating the units indicator one complete revolution during 100 complete revolutions of the winding spindles 17.

The hundreds indicator 201 consists of a dial 230 rotatably mounted upon a collar 231 which is keyed to a reduced portion 232 of a shaft 233 and has pins 234 frictionally carried thereby and receivable in apertures of a pointer 235. A lock nut 236 is threadedly connected to the reduced portion 232 of the shaft 233 and when loosened permits movement of the dial 230 relative to the pointer 235, but when tightened holds the dial against rotation relative to the pointer 235 and the collar 231. The dial 230 is calibrated adjacent its periphery, the spaces between the calibrations indicating the distance at which the dial will be rotated just prior to each complete rotation of the dial 202. The shaft 233 is journaled in a bearing of a bracket 240 and has fixed thereto upon one side of the bracket 240 a ratchet wheel 241 and upon the opposite side of the bracket 240 a drum 242. The ratchet wheel 241 has teeth formed in the periphery thereof equal in number to the spaces between the calibrations upon the dial 230.

A mechanism is associated with the units indicator 200 for moving the ratchet wheel 241 a distance of one tooth just before the units indicator 200 completes each revolution for the purpose of moving the hundreds indicator 201 the distance of one space upon the dial 230. This mechanism consists of a roller 245 mounted upon the inner face of the dial 202 and positioned so that it will engage the lower end of a pawl actuating lever 246 during each rotation of the dial 202 to move the lever about its pivot 247. The movement imparted to the lever 246 by the roller 245 is to the left (Fig. 12) and during this movement of the lever a pawl 248, which has one end pivotally mounted upon the lever, is moved to the left so that the tooth engaging end 249 thereof passes over one of the teeth of the ratchet wheel 241. The end 249 of the pawl 248 is held in engagement with the ratchet wheel 241 by a spring 250 resiliently connecting the pawl with the lever 246. As the roller 245 is moved free of the lever 246 (Fig. 12) the lever is moved to the right about its pivot 247 into engagement with a suitable stop member 251 moving with it the pawl 248 and rotating the ratchet wheel 241 the distance of one tooth.

A retaining pawl 255, pivotally supported at 256, is associated with the ratchet wheel 241 to hold the sprocket wheel against rotation in a counterclockwise direction (Fig. 12) when the actuating pawl 248 is being moved to the left from its engagement with one tooth to its engagement with another tooth of the ratchet wheel. The pawls 249 and 251 retain their positions in engagement with the ratchet wheel 241 until the machine is stopped after winding the desired number of convolutions of strands upon the winding spindles 17 after which the pawls may be moved away from the ratchet wheel 241 simultaneously to allow the hundreds indicator to return to its normal or starting position. This mechanism is associated with a mechanism for resetting the units indicator and includes the handle 215, the connecting rod 216 and the movable clutch member 213.

When the handle 215 is moved outwardly to the left (Fig. 14) the clutch member 213 is moved to the left free of the clutch member 218, disconnecting the counting mechanism from the shaft 37 and permitting the operator to rotate the handle 215, during which rotation the dial 202 and the pointer 206 will be rotated to the starting position. The rotation of these members in a clockwise direction will be stopped, so as to accurately locate the units indicator at the starting position, by the engagement of the projection 220 of the shaft 208 with the stop member 221 (Figs. 12 and 14).

During the movement of the clutch member 213 to the left (Fig. 14) a yoke 260 is rocked to the left with a shaft 261 due to its connection indicated at 262 with the clutch member 213. The shaft 261 is journaled in a bearing 263 and has mounted upon the opposite end thereof an actuating arm 264 which engages an adjustable screw 265 of a lever 266. The lever 266 is operatively connected at 267 to a bell crank lever 268 which is pivoted at 269 and has a projection 270 extending beneath the pawl 268 (Figs. 12 and 13) for the purpose of moving the pawl 248 free of the ratchet wheel 241 when the levers 266 and 268 are actuated. A pull rod 273 forms a connection between the projection 270 of the bell crank lever 268 and the retaining pawl 255 so that the pawls 248 and 255 will be moved free of the ratchet wheel 241 simultaneously when the units and hundreds indicators are disconnected from the shaft 37 by disconnecting the clutch (Fig. 14). When the pawls 248 and 255 are moved free of the ratchet wheel 241 the shaft 233 is rotated in a counterclockwise direction (Fig. 12) by a weight 275 which is connected to the drum 242 by a cable 276, the upper end of which is positioned in a groove 277 of the drum wherein the cable is positioned during rotation of the shafts 233 and the parts fixed thereto in a clockwise direction. The rotation of the shaft 233 in a counterclockwise direction is stopped at a predetermined position to accurately position the hundreds indicator at the starting position. In accomplishing this result, a resilient stop member 280 is pivotally mounted at 281 and normally held in engagement with a pin 282 by a spring 283 so that an arm 284, integral with the collar 223 (Figs. 12 and 13), will strike thereagainst when returned to the dotted line position shown in Fig. 12. The arm 284 may be moved past the stop member 280, when being rotated in a clockwise direction during the operation of the machine, but will be stopped by the member 289 when rotated in a counterclockwise direction to accurately position the hundreds indicator 201 at starting position.

An electrical circuit 290 is associated with the units indicator 200 and the hundreds indicator 201 for automatically stopping the machine when the desired number of windings as indicated by the combination of the two indicators, have been wound upon winding spindles. The circuit 290 includes the solenoid 47, which has been previously described as an electrical control mechanism for automatically controlling the inward movement of the retaining bar 43 (Fig. 3) when a predetermined number of windings have been made upon the winding spindles 17, for moving the retaining bar free of the pivot head 45 for allowing the pivot head to resume its normal position, thus stopping the actuation of the machine. The circuit 290 can only be closed for energizing the solenoid 47 when two switches 291 and 292 are closed at the same time. The switch 291 is pivotally supported at 293 and has a tapered projection 294 which is arranged to be engaged by a switch actuating finger 295 mounted upon the units dial 203. With this arrangement the switch 291 is closed during each revolution of the units dial 202, but the circuit 290 cannot be completed until the switch 292 is moved into closed position and is held in this position while the switch 291 is closed. The switch 292 is pivotally supported at 296 and has a laterally extending member 297 provided with a flat under surface 298 into engagement with which a switch actuating finger 300 is arranged to be moved for moving the switch 292 into closed position. The switch actuating finger 300 is carried by the hundreds dial 230 and is not moved into engagement with the projection 297 of the switch 292 until the hundreds dial 230 has completed the desired rotative movement.

When a machine is ready to begin its operation; that is, when the ends of the strands 16 have been secured to the winding spindles 17, the units indicator 200 and the hundreds indicator 201 are adjusted so that their combined reading will indicate the desired number of convolutions of strands to be wound upon the winding spindles for each coil. For the purpose of illustration, let it be assumed that the operator wishes 7950 convolutions of strand for each coil. In setting the indicators, the units dial 202 is moved relative to the pointer 206, after the nut 207 has been made loose, so that the indication 50 will be adjacent the outer end of the pointer, then, by tightening the nut 207 to hold the units dial 202 against movement relative to the pointer 206 the units indicator, is ready for operation. A similar adjustment is then made for setting the hundreds dial. In making this adjustment the nut 236 is made loose so that the hundreds dial 230 may be moved relative to the pointer 235 until the indication 79 is adjacent the outer end of the pointer 235 and then by turning the nut 236 in a clockwise direction, the hundreds dial 230 is held against movement relative to the pointer 235. The adjustment of the units indicator varies the time at which the switch 291 will be closed and the time at which the roller 245 will engage the lever 246 to actuate the hundreds indicator 201. The adjustment of the hundreds indicator 201 varies the time at which the switch actuating finger 300 will be moved into engagement with the portion 297 of the switch 292 to close the switch.

The starting position of the units indicator 200 and the hundreds indicator 201 are shown in Fig. 1 and after the machine is set in operation a continuous rotation is imparted to the units indicator and an intermittent rotative movement is imparted to the hundreds indicator while the units indicator is completing each revolution. The units indicator, during each cycle of rotation, will close the switch 291 and actuate the lever 246 with the pawl 248 to impart an intermittent rotary motion to the hundreds indicator 201 through the ratchet wheel 241 and the shaft 233. The actuation of the hundreds indicator 201 is slightly in advance of the completion of each cycle of the units indicator, and with this arrangement the switch actuating finger 300 will be moved beneath the projection 297 where it will remain at rest, holding the switch 292 in closed position, until the switch actuating finger 295 engages the portion 294 to move the switch 291 into closed position. This occurs after 79 complete cycles of the units indicator together with 79 intermittent movements of the hundreds indicator and the further movement of the units indicator for 50 calibrations upon the units dials. When both of the switches 291 and 292 are moved into closed positions to complete the circuit 290, the solenoid 47 is energized drawing the retaining bar 43 free of its frictional engagement with the pivot head 45 and allowing the bracket 31 (Figs. 2 and 3) to be moved upwardly by the springs 57 and 58 to loosen the belt 35 upon the pulley 36 and to apply the brake 59 to the pulley 36, stopping the actuation of the machine.

The counting mechanism makes it possible for the machine to continue its operation without the aid of the operator, and after a predetermined number of convolutions have been wound upon the winding spindles 17, the machine will be automatically stopped due to the completion of the circuit 290 through the actuation of the counting mechanism.

After the machine has been stopped by the closing of the circuit 290 the coils may be removed from the winding spindles 17 and the machine may again be made ready for an additional winding operation. Before starting the machine again the operator pulls outwardly upon the handle 215, disconnecting the counting mechanism from the shaft 37 by disconnecting the clutch member 213 from the clutch member 218, during which movement the yoke 260 is rocked with the shaft 261 moving the levers 266 and 268 and causing the pawls 248 and 255 to be moved away from the ratchet wheel 241. As soon as the pawls 248 and 255 are moved free of the ratchet wheel 241, the weight 275 causes a counterclockwise rotation of the shaft 233, and the parts connected thereto including the dial 230 and the pointer 235, until the arm 284 is moved into the dotted line position (Fig. 12) in engagement with the stop member 280. The stopping of the arm 284 at this position accurately sets the hundreds indicator 201 in the starting position shown in Fig. 1. All of this takes place as soon as the handle 215 is moved outwardly, and, by the operator rotating the handle 215 in a clockwise direction until the projection 220 (Fig. 14) of the shaft 209 engages the stop member 221, the units indicator will be correctly positioned as shown in Fig. 1. When the operator releases the handle 215, the spring 217 will force the clutch member 213 into engagement with the clutch member 218 and when the machine is again set in operation the counting mechanism will be actuated until the desired number of convolutions have been wound upon the spindles 17, at which time the circuit 290 will be closed by the closing of both switches 291 and 292 to energize the solenoid 47 and stop the machine.

What is claimed is:

1. In a material winding machine, a winding spindle, means for rotating said spindle to wind material thereon, means for distributing the material upon said spindle, said last mentioned means comprising a movable member constrained to travel along a path which is so related to the axis of the spindle that a component movement of the member is in a direction longitudinally of said spindle and means for moving the member along said path at a constant speed, and means for adjusting the angular relationship between said path of movement of the member and the axis of the spindle to alter the speed of said component movement of the member.

2. In a material winding machine, a winding spindle, means for rotating said spindle to wind material thereon, means for distributing the material upon said spindle, said last mentioned means comprising a movable member constrained to travel along a path which is so related to the axis of the spindle that a component movement of the member is in a direction longitudinally of said spindle, means for moving the member along said path and a reciprocable material guiding element actuated by said member and constrained to move in a rectilinear path parallel to the axis of said spindle, and means for adjusting the relationship between said path of movement of the member and the axis of the spindle to alter the speed of said component movement of the member and thereby the speed of movement of said material guiding element.

3. In a material winding machine, a winding spindle, means for rotating said spindle to wind material thereon, means for distributing the material upon said spindle, said last mentioned means comprising a movable member constrained to travel along a path which is so related to the axis of the spindle that a component movement of the member is in a direction longitudinally of said spindle, means for moving the member along said path and a reciprocable material guiding element actuated by said member and constrained to move in a rectilinear path parallel to the axis of said spindle, means for adjusting the relationship between said path of movement of the member and the axis of the spindle to alter the speed of said component movement of the member and thereby the speed of movement of said material guiding element, and additional means under the control of said guiding element for altering the speed of movement thereof.

4. In a material winding machine, a winding spindle, means for rotating said spindle to wind material thereon, means for distributing the material upon said spindle, said last mentioned means comprising a reciprocable material guiding element constrained to move in a rectilinear path parallel to the axis of said spindle, a reciprocable member connected to said element for moving it along said path and means for reciprocating said member to reciprocate said element, said member being constrained to move in a path which is so related to the path of movement of said element that a component movement of said member is in the direction of movement of said element, and means for adjusting the relationship between the paths of movements of said element and said member to alter the speed of movement of said element.

5. In a material winding machine, a winding spindle, means for rotating said spindle to wind material thereon, means for distributing the material upon said spindle, said last mentioned means comprising a reciprocable material guiding element constrained to move in a rectilinear path parallel to the axis of said spindle, a reciprocable member connected to said element for moving it along said path and means for reciprocating said member to reciprocate said element, said member being constrained to move in a path which is so related to the path of movement of said element that a component movement of said member is in the direction of movement of said element, means for adjusting the relationship between the paths of movements of said element and said member to alter the speed of movement of said element, and means for imparting an additional movement to said member at each reversal in the direction of movement thereof to thereby momentarily alter the speed of movement of said element at the beginning of its travel in either direction.

6. In a strand winding machine, a winding spindle, means for rotating said spindle to wind a strand thereon, means for distributing the strand upon said spindle, said last mentioned means comprising a rotatable shaft, means for rotating said shaft, a movable member operatively connected to said shaft in such a manner that rotation of said shaft causes the member to move in a rectilinear path parallel to the axis of said shaft and a strand guide connected to and movable with said member, said axis of said shaft being so related to the axis of said spindle that a component movement of said member is in a direction longitudinally of said spindle, and means for adjusting the relationship between said axes of said shaft and spindle to alter the speed of said component movement of said member.

7. In a strand winding machine, a winding spindle, means for rotating said spindle to wind a strand thereon, means for distributing the strand upon said spindle, said last mentioned means comprising a rotatable screw threaded shaft, means for rotating said shaft, a movable member having a screw thread engagement with said shaft whereby said member is moved longitudinally of said shaft at a speed corresponding to the speed of said shaft and a strand guide connected to and movable with said member, said shaft being so related to the spindle that a component movement of said member is in a direction longitudinally of said spindle, and means for changing the relationship between said shaft and spindle to alter the speed of said component movement of said member.

8. In a strand winding machine, a winding spindle, means for rotating said spindle to wind a strand thereon, means for distributing the strand upon said spindle said last mentioned means comprising a rotatable screw threaded shaft, means for rotating said shaft a movable member having a screw thread engagement with said shaft whereby said member is moved longitudinally of said shaft at a speed corresponding to the speed of said shaft and a strand guide connected to and movable with said member, said shaft being so related to the spindle that a component movement of said member is in a direction longitudinally of said spindle, means for changing the relationship between said shaft and spindle to alter the speed of said component movement of said member, and means for reversing the direction of rotation of said shaft to reverse the direction of movement of said member.

9. In a strand winding machine, a winding spindle means for rotating said spindle to wind a strand thereon, means for distributing the strand upon said spindle, said last mentioned means comprising a rotatable screw threaded shaft, means for rotating said shaft, a movable member having a screw thread engagement with said shaft whereby said member is moved longitudinally of said shaft at a speed corresponding to the speed of said shaft and a strand guide connected to and movable with said member, said shaft being so related to the spindle that a components movement of said member is in a direction longitudinally of said spindle, means for changing the relationship between said shaft and spindle to alter the speed of said component movement of said member, means for reversing the direction of rotation of said shaft to reverse the direction of movement of said member, and means for imparting an endwise movement to said shaft at said reversal in the direction of rotation thereof to momentarily alter the speed of movement of said member.

10. In a winding machine, a rotatable spindle for winding material, a member movable longitudinally of said spindle for distributing the material thereon, a driven shaft angularly adjusable with respect to said spindle, means interconnecting said shaft and said member in such a manner that rotation of said shaft causes the member to move longitudinally of said spindle, said means comprising an element constrained to move in a path permanently fixed with respect to the axis of said shaft, and means for angularly adjusting said shaft relative to said spindle to alter the speed of movement of said member.

11. In a winding machine, a winding spindle, a distributor element movable longitudinally of said spindle, a rotatable shaft angularly adjustable with respect to said spindle, means for rotating said shaft, and a member operatively connected to said shaft in such a manner that rotation of said shaft causes the member to move longitudinally of said shaft, said member having a sliding connection with said distributor element whereby said element is operatively connected to said member for movement thereby at a speed determined by the angular position of said shaft relative to said spindle.

12. In a winding machine, a rotatable winding spindle, a reciprocable distributor element constrained to move in a rectilinear path parallel to the axis of said spindle, means for actuating said element comprising a rotatable screw threaded shaft angularly adjustable with respect to said spindle, means for rotating said shaft at a speed determined by the speed of said spindle, means for reversing the direction of rotation of said shaft, a nut follower on said shaft having a screw thread engagement therewith and restrained against rotation whereby through the rotation of said shaft the follower is moved longitudinally of said shaft at a speed and in a direction corresponding to the speed and direction of rotation, respectively, of said shaft, said follower being operatively connected to said distributor element to impart a reciprocatory movement thereto, said connection being slidable for permitting angular adjustment of said shaft relative to said spindle, and means for angularly adjusting said shaft relative to said spindle to alter the speed of movement of said distributor element relative to the speed of the winding spindle.

13. In a winding machine, a winding spindle, a distributor movable longitudinally of said spindle for distributing material thereon, means for moving said distributor, means for reversing the direction of movement of said distributor, means for actuating said reversing means, means for energizing said actuating means comprising a movable member, and means separate from the distributor for moving said member in synchronism with the movement of said distributor.

14. In a winding machine, a winding spindle, a distributor movable longitudinally of said spindle for distributing material thereon, two rotatable shafts, means for rotating said shafts in synchronism, one of said shafts having a screw thread engagement with said distributor whereby through the rotation of said shaft the distributor is moved longitudinally of the spindle, means for reversing the direction of rotation of said shaft to thereby reverse the direction of movement of said distributor, means for actuating said reversing means, and means having a screw thread engagement with the other of said shafts for energizing said actuating means.

15. In a winding machine, a winding spindle, a distributor movable longitudinally of said spindle for distributing material thereon, means for moving said distributor, means for reversing the direction of movement of said distributor, and spring means for actuating said reversing means and for imparting an additional movement to said distributor to alter the speed of movement thereof.

16. In a winding machine, a winding spindle, a distributor movable longitudinally of said spindle for distributing material thereon, means for moving said distributor, means for reversing the direction of movement of said distributor, spring means for actuating said reversing means and for imparting an additional movement to said distributor to alter the speed of movement thereof, and means for energizing said spring means comprising a movable member and means for moving said member in synchronism with the movement of said distributor.

17. In a winding machine, a winding spindle, a distributor movable longitudinally of said spindle for distributing material thereon, means for moving said distributor, means for reversing the direction of movement of said distributor, spring means for actuating said reversing means and for imparting an additional movement to said distributor to alter the speed of movement thereof, means for energizing said spring means comprising a movable member and means for moving said member in synchronism with the movement of said distributor, and means under the control of the distributor for controlling the operation of said spring means.

18. In a strand winding machine, a winding spindle, a strand guide movable longitudinally of said spindle, means for moving said strand guide, spring means for imparting an additional movement to said strand guide to alter the speed of movement thereof, and electromagnetically operated means under the control of said strand guide for controlling the operation of said spring means.

19. In a strand winding machine, a winding spindle, a strand distributor reciprocable longitudinally of said spindle, actuating means for reciprocating said distributor, spring means for imparting an additional movement to said distributor at each reversal in the direction of movement thereof to alter the speed of movement of said distributor, means operated by said actuating means for energizing said spring means, and latch means under the control of said distributor for controlling the operation of said spring means.

ROBERT HOFSTETTER.